Feb. 16, 1932. M. ANDERSON 1,845,861
CHILD'S PLAYHOUSE
Filed July 11, 1930 2 Sheets-Sheet 1
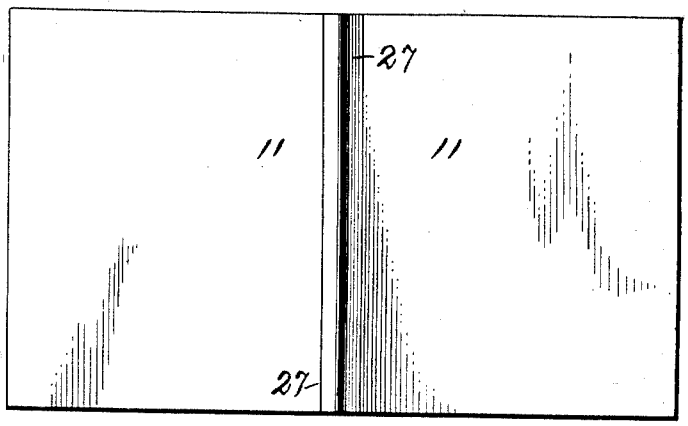
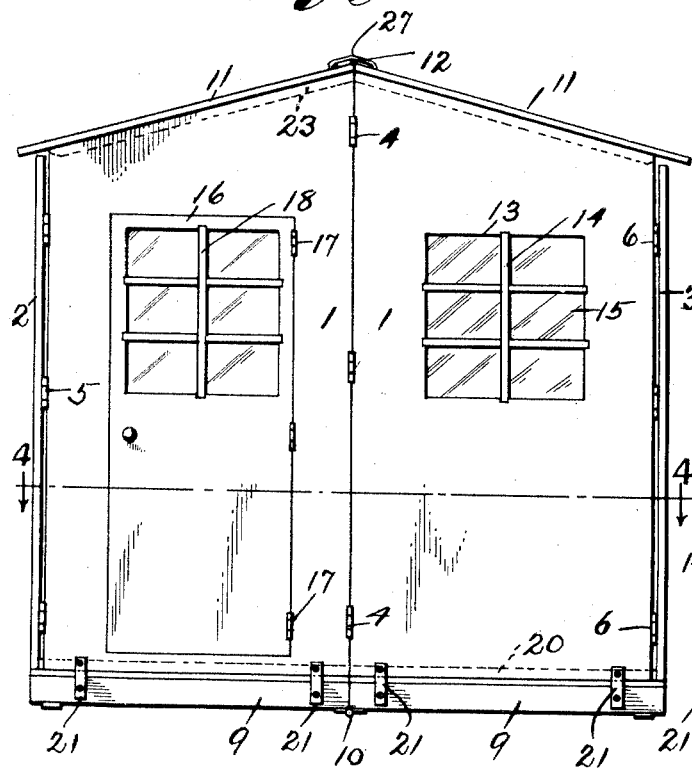
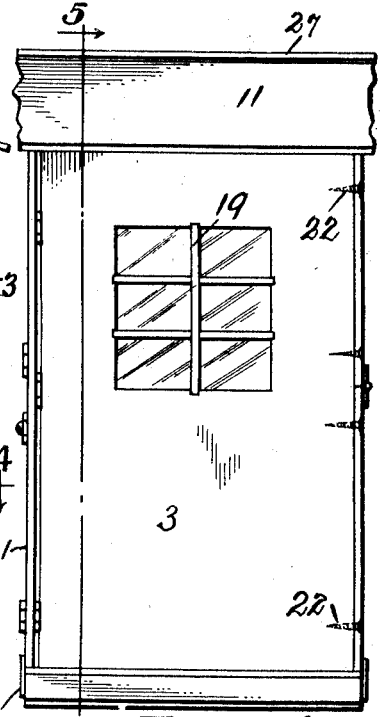

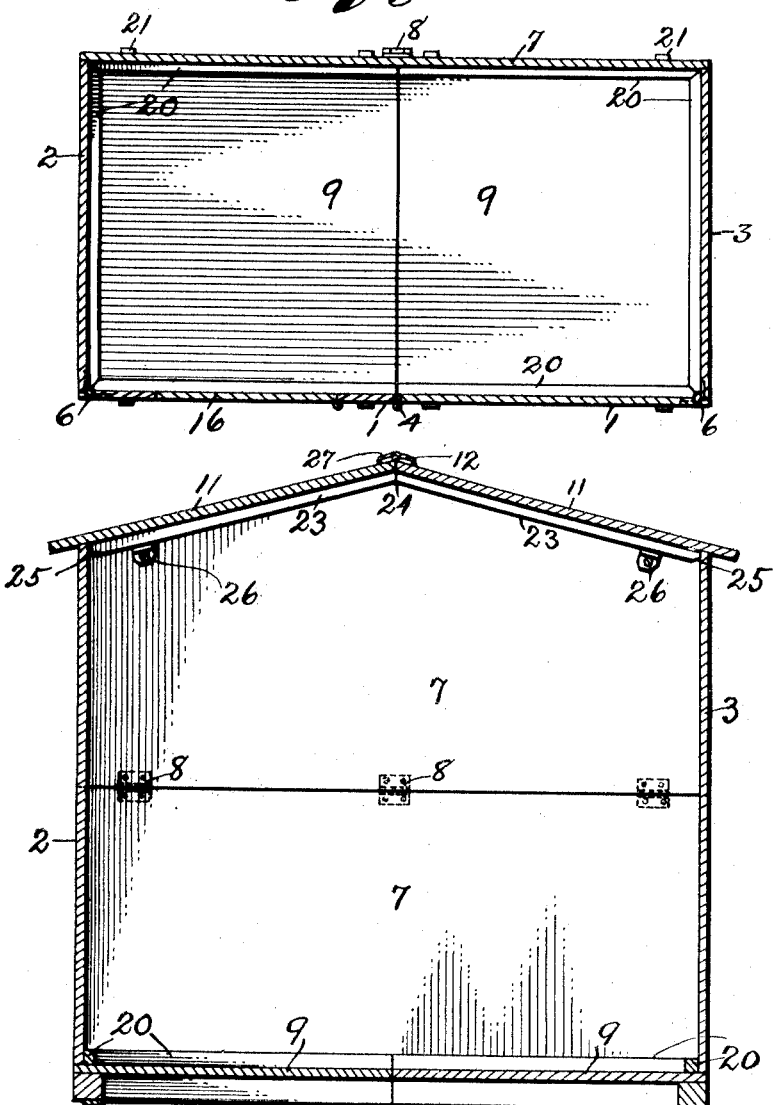

Patented Feb. 16, 1932

1,845,861

UNITED STATES PATENT OFFICE

MAURICE ANDERSON, OF NEGAUNEE, MICHIGAN

CHILD'S PLAYHOUSE

Application filed July 11, 1930. Serial No. 467,321.

The object of this invention is to provide an attractive, strong, durable child's playhouse composed of units each of multiple jointed sections which can be quickly and easily extended and connected to erect the house, or readily disconnected and folded so that the multiple units may be stacked on each other in compact and convenient form for transportation.

A playhouse constructed according to my invention is intended for use on a porch or in a nursery, or, on a lawn. The floor and rear wall afford great stability and assist in preventing the house from being tipped over when it is used on a lawn and are preferably used when the house is set up on a porch or in a nursery although when used on a porch or in a nursery, the floor and rear wall are not so essential, as the front and sides may be backed up against the wall of the porch or of the nursery and the floor of the porch or nursery then constituting the floor of the playhouse. Beaverboard, composition board, or ordinary lumber may constitute the material of which the playhouse is constructed.

As hereinafter described and shown in the accompanying drawings, the front and sides are hinged together, the front also, by preference, being formed of hinged sections, thus constituting a multiple unit which is adapted for folding when the playhouse is to be collapsed for transportation or storage. The back or rear wall comprises a multiple unit whose hinged sections can be folded for transportation or storage. The roof is a multiple unit composed of sections hinged together and having beams which fit within and engage the front, side, and rear walls, thus holding the roof in position. The floor is a multiple unit composed of sections jointed together and adapted to be folded for storage or transportation. Suitable connections or fastenings are provided for connecting the different sections together to render the structure rigid. Suitable windows and a door are provided which are self-contained with the sides and front of the house.

The sides and front co-operate in an improved manner with a sill extending around the edge of the floor.

If the playhouse be used on a porch or in a nursery, instead of the multiple unit back, one or more crossbars may be connected to the rear edges of the side walls to brace them and the floor may be omitted. Preferably, however, the multiple unit back and multiple unit floor are employed because they strengthen and brace the side walls and the front and prevent accidental tipping over of the playhouse.

The present playhouse is preferably of a size adapting it to accommodate two or three children with furniture and playthings but may be constructed in larger sizes.

In the accompanying drawings:

Figure 1 is a plan view of the house, showing the improved roof;

Fig. 2 is a front elevation of the playhouse;

Fig. 3 is an end elevation thereof;

Fig. 4 is a horizontal section on the line 4—4, Fig. 2; and

Fig. 5 is a vertical section on the line 5—5, Fig. 3.

The house comprises, principally, four units, namely, the unit comprising the front wall 1, 1, the end walls 2, 3, all of which constitute a single multiple unit whose parts are connected by the hinges 5, 6; the rear wall whose parts 7, 7 are connected by hinges 8; the floor whose parts 9, 9 are connected by hinges 10; and the roof whose parts 11, 11 are connected by hinges 12.

The foregoing multiple unit construction lessens the number of independent sections or pieces which have to be handled in setting up or collapsing the house and also enables the sections of the house to be folded and stacked in compact arrangement for storage or transportation.

The front may have a glazed or unglazed window 13. As shown, this window is simply an opening in the front, with suitable bars or pieces 14. Glass 15 may be provided, if desired.

The other section of the front 1, is provided with a door 16 hinged thereto at 17. This door may have an open part or window 18 similar to the window 13.

The sides 2, 3 may be provided with windows 19, similar to the window 13.

The rear wall 7, 7 may, or may not, have one or more windows, according to preference.

The floor 9, 9 has a sill 20 which extends all the way around said floor, inwardly from the outer edge thereof, leaving a space or rabbet for the seating of the lower edges of the front 1, 1, sides 2, 3, and back 7.

To securely connect the front 1, 1, sides 2, 3, and back 7 to the floor 9, metal strap fastenings 21 may be provided at suitable points, preferably at the front and rear, although they may be provided at the sides. These metal strap fastenings may be attached by screws so that on removal of the upper ones of the screws, the strap fastenings may be swung down and the front, sides, and rear removed.

The back or rear wall 7, 7 is fastened to the rear edges of the sides 2, 3 by screws 22. By removing these screws, it can be detached and collapsed.

If desired, a horizontal bracing strap may connect the front sections 1, 1 together.

The roof 11, 11 has beams 23 on the respective sections thereof whose upper ends abut at 24. These beams have their outer ends abutting the upper ends of the walls 2, 3 at 25, thus centering the roof and preventing it from sliding off. To more securely fasten the roof, brackets 26 may secure the beams 23 to the upper parts of the sections 1, 1 and 7.

To prevent rain from passing downwardly between the abutting edges of the roof sections 11, 11, a strip 27 of suitable waterproof flexible material is provided which overlies the joint and the hinges 12.

What I claim is:

The herein described child's playhouse comprising a multiple unit floor embodying foldable sections hinged together and having a rabbet in the region of its edges, a multiple unit superstructure embodying a front and sides hinged to said front, said front and sides having their lower edges received in the said rabbet, fastening devices connecting the front to the floor, a multiple unit back embodying hinged foldable sections seated in the rabbet at the rear of the floor, said back being connected to said sides, and a multiple unit roof embodying foldable hinged sections provided on their undersurfaces with beams, said roof resting on the house and said beams being received within the upper part of the house, and means for fastening the roof in position.

In testimony whereof I affix my signature.

MAURICE ANDERSON.